(12) United States Patent
Bacigalupo

(10) Patent No.: US 6,304,979 B1
(45) Date of Patent: Oct. 16, 2001

(54) LOGIC TO ENABLE/DISABLE A CLOCK GENERATOR IN A SECURE WAY

(75) Inventor: Tommaso Bacigalupo, San Jose, CA (US)

(73) Assignee: Infineon Technologies North America Corp., Iselin, NJ (US)

(*) Notice: Subject to any disclaimer, the term of this patent is extended or adjusted under 35 U.S.C. 154(b) by 0 days.

(21) Appl. No.: 09/139,533

(22) Filed: Aug. 25, 1998

(51) Int. Cl.$^7$ .................................................. G06F 1/04
(52) U.S. Cl. ............................................ 713/601; 713/322
(58) Field of Search .................................. 713/322, 400, 713/500, 501, 601

(56) References Cited

U.S. PATENT DOCUMENTS

| 5,297,276 | * | 3/1994 | Millar et al. | 713/601 |
| 5,428,765 |   | 6/1995 | Moore | 395/550 |
| 5,625,807 | * | 4/1997 | Lee et al. | 713/601 |
| 6,163,848 | * | 12/2000 | Gephardt et al. | 713/322 |

* cited by examiner

Primary Examiner—Dennis M. Butler
(74) Attorney, Agent, or Firm—Fish & Richardson, P.C.

(57) ABSTRACT

A clock generator supplying clock signals to a synchronous system is disabled in response to a first synchronous signal from the synchronous system and enabled in response to an asynchronous signal. Upon the enabling of the clock generator in response to the synchronous signal, a second synchronous signal is transmitted to the synchronous system to notify the system that the clock generator is enabled. In the preferred embodiment, the register bits in a shift register are set by the first synchronous signal to a value that disables the clock generator and then the register bits can be set by an asynchronous signal to a value that enables, or wakes up, the clock generator. The first synchronous signal that is used to disable the clock generator is also used to initiate a synchronous counter that counts a pre-established number of clock signals from the clock generator and then transmits a synchronous wake-up signal to the synchronous system. Utilizing the counter and the shift register allows a clock generator to be restarted with an asynchronous signal while maintaining clean separation between the synchronous and asynchronous domains of an electrical system.

20 Claims, 4 Drawing Sheets

LOGIC TO ENABLE/DISABLE A CLOCK GENERATOR IN A SECURE WAY

BACKGROUND OF THE INVENTION

The invention generally relates to controlling a clock generator in an electronic system and more particularly to a method and system for disabling and enabling a clock generator in a synchronous electronic system.

DESCRIPTION OF THE RELATED ART

Digital electronic systems rely on a clock generator to provide a clock signal that is used to synchronize operations within the system. With the proliferation of battery powered electronic devices, it has become more important to design electronic systems having low power requirements. One technique for conserving battery power is to turn off the clock generator during intervals in which performance of the system will not be adversely affected.

Once a clock generator has been disabled from a synchronous system, the restarting or re-enabling of the clock generator is a critical operation. Because there are no clock signals being generated in the system, the clock restart or wake-up must be triggered by an asynchronous event. While it is possible to restart the clock generator with an asynchronous signal, the synchronous electronic system cannot be notified of the clock restart with the asynchronous signal. The logic of the synchronous electronic system cannot be notified of the start of the clock with an asynchronous signal because any asynchronous signals introduced to the synchronous system would likely cause setup and/or hold time violations in the flip-flops that are integrated into the system circuitry, causing the system to fail.

In an instance in which a clock signal is disabled within a particular subsystem, but is still active in a broader system, U.S. Pat. No. 5,428,765, entitled "Method and Apparatus for Disabling and Restarting Clocks," to Moore discloses a method and apparatus that re-enables the subsystem clock a fixed period of time after an external asynchronous wake-up event occurs. Although Moore works well for its intended purpose, Moore applies to systems where the transmission of a clock signal to a subsystem is disabled/enabled while a broader system clock continues to run, as opposed to the situation where a system clock generator is completely disabled such that no clock signals are available throughout the system. In addition, since Moore discloses a system in which a system clock continues to run, there is no need to notify the main system that a particular subsystem has been awakened.

In view of the problems involved with restarting a system clock in a synchronous system where the clock has been temporarily disabled, what is needed is a method and apparatus that disable/enable a clock generator and that notify the broader synchronous system that the clock has been restarted.

SUMMARY OF THE INVENTION

A method and apparatus for controlling a clock generator involve enabling the clock generator in response to an asynchronous signal and notifying a related synchronous system of the clock enablement with a synchronous signal, such that no asynchronous signal is introduced into the synchronous system. In the preferred embodiment, the register bits in a shift register are set by a synchronous signal to a value that disables the clock generator, and then the register bits can be flipped by the asynchronous signal to a value that enables the clock generator. The same synchronous signal that is used to disable the clock generator is used to initiate a synchronous counter that is subsequently used to notify the synchronous system, with a second synchronous signal, that the clock generator has been enabled. The notification occurs when the counter reaches a pre-established value.

In the preferred embodiment, the logic for controlling the clock generator is connected to the synchronous system and includes a state machine, the shift register, the counter, and an asynchronous edge detector. The synchronous system is an electronic system, such as a microprocessor or an application-specific integrated circuit (ASIC), that operates primarily in a synchronous manner. In a preferred embodiment, the system is part of a larger electronic device, such as a handheld computer or a portable telephone. The state machine is a logic element that indicates one of a finite group of states based on particular inputs. Preferably, the state machine utilizes standard logic and flip-flop devices to indicate either a first state in which the clock generator is running or a second state in which the clock generator is not running. When the state machine transitions from the first state to the second state, the state machine generates a signal which plays a role in the process that causes the clock generator to be disabled. The clock generator is located within an asynchronous clock domain of the logic and consists primarily of a clock crystal, an oscillator, and a phase-locked loop. The clock crystal, the oscillator and the phase-locked loop are all conventional devices that are formed and operated in a conventional manner. The clock signals generated by the clock generator are distributed through a clock distribution system to other logic elements in the synchronous system. The asynchronous edge detector is a conventional device that may consist of a delay line and an AND gate and that detects the edge of an incoming asynchronous event to generate an asynchronous pulse that is sent to the shift register.

Implementation of the shift register and the counter represent the focus of the invention. The shift register is a binary shift register that is formed from a series of flip-flops. In the preferred embodiment, the shift register has three inputs and one output. The first input receives a signal from the state machine to clear all of the register bits of the shift register to a value that disables the clock generator. The second input of the shift register provides a set bit to the shift register at each clock cycle. The number of clock cycles required for the set bit to travel through the shift register is equivalent to the number of flip-flops in the shift register. The shift register has a third input that receives an asynchronous signal from an asynchronous source. The third input is connected to the asynchronous set or reset of the flip-flops that make up the shift register. The reception of the asynchronous signal flips all of the register bit values in the shift register to a value that enables the clock generator and since no clock is running, setup and hold time violations are avoided. The output of the shift register is connected to the clock generator and provides the signal that either disables the clock generator or enables the clock generator in response to the various input signals to the shift register.

The counter is a conventional device that synchronously changes its counter value at each clock cycle while the clock generator is enabled. In the preferred embodiment, the counter value is refreshed to a pre-established initial counter value each time a synchronous refresh signal is received from the state machine.

The first operation performed by the logic is the disabling of the clock generator upon detection of a particular condition at the synchronous system (e.g., a continued period of inactivity). The disabling of the clock generator is initiated by the synchronous system generating a "go to deepsleep" signal that indicates to the state machine that the clock generator should be disabled. In response to the go to deepsleep signal, the state machine changes from its first state to its second state. The transition of the state machine from the first state (or run state) to the second state (or deepsleep state) causes the state machine to output a "load" signal. The load signal is transmitted to the counter and to the shift register. In response to the load signal, the counter is refreshed to its pre-established initial value and the shift register is cleared such that the register bits reflect a value that disables the clock generator. As a result, the shift register generates a "deepsleep_n" signal that is transmitted to the clock generator and operates to disable or shutdown the clock generator, thereby completing the disable operation.

During the time that the clock generator is shutdown, all synchronous operations in the system and in the clock control logic are frozen. With regard to the clock control logic, the counter does not decrement its counter value and the shift register does not shift values in the register bits unless there is a clock signal. In the preferred embodiment, the clock generator can be disabled for an unlimited period of time.

The next operation of the logic is the enabling of the clock generator, where the enabling is triggered by some outside asynchronous event. The asynchronous event is recognized by the asynchronous edge detector, causing the asynchronous edge detector to generate an asynchronous pulse, or set signal, on the third input of the shift register. The set signal flips the shift register bits in the shift register to a value that deactivates the deepsleep_n signal and activates the clock generator. The clock generator starts generating clocks signals some time after the deactivation of the deepsleep_n signal, however, the exact time required is not critical to the invention.

The last operation of the logic is to notify the synchronous system with a synchronous signal that the clock generator is enabled. This operation is initiated when the clock generator begins generating clock signals again. As the clock generator begins generating clock signals, the newly refreshed counter value continues to synchronously count down towards zero. When the counter reaches zero, the counter generates a synchronous signal, referred to as a wake-up signal, which is transmitted to the synchronous system, indicating that the clock generator is enabled. The wake-up signal sent to the system is a synchronous signal that is synchronized with the clock generator, even though the initial signal that started the clock generator wake-up process was an asynchronous signal. The wake-up signal is also sent to the state machine, where the wake-up signal causes the state machine to change from the deepsleep state to the run state.

In an enhancement of the preferred embodiment of the invention, a phase-locked loop signal is output from the phase-locked loop to indicate to the state machine when the phase-locked loop has reached the target clock frequency. In addition, a synchronizer is located between the phase loop and the state machine to synchronize the signal from the phase-locked loop.

DETAILED DESCRIPTION

Figure 1:
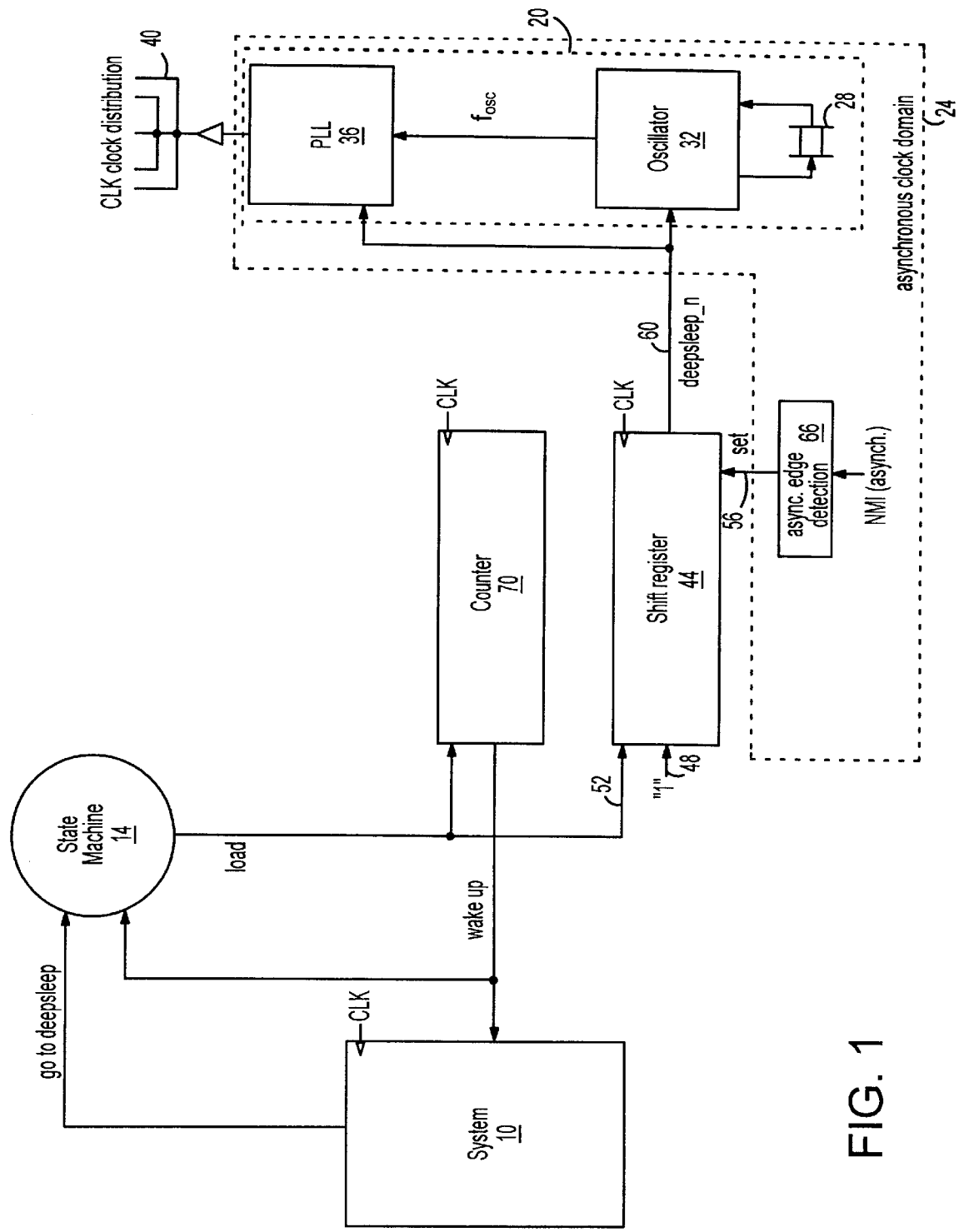
FIG. 1 is a logic diagram for a system which disables and enables a clock generator in accordance with the invention.

FIG. 1 is a logic diagram of an arrangement which disables a clock generator of a synchronous system with a synchronous signal of adjustable duration and enables the clock generator through an asynchronous event. Further, the synchronous system is notified of the clock enablement by a synchronously generated signal. The individual elements of the depicted logic are described with reference to FIG. 1 and the operation of the logic is described with reference to FIGS. 1, 2 and 3.

The system 10 identified in FIG. 1 represents an unspecified electronic system such as a microprocessor or an application-specific integrated circuit (ASIC) that operates primarily in a synchronous manner. In a preferred embodiment, the system along with the other logic elements are all located within the same integrated circuit or chip, where the chip is part of a larger electronic device, such as a handheld computer or a portable telephone.

A state machine 14 is a logic element that indicates one of a finite group of states based on a particular input. In the preferred embodiment, the state machine utilizes standard logic and flip-flop devices to indicate one of two states. The first state is triggered by a clock "wake-up" signal and is referred to as the "run" state. While in the run state, the state machine does not trigger any external events. The second state is triggered by a "go to deepsleep" signal and is referred to as the "deepsleep" state. The transition from the run state to the deepsleep state triggers the state machine to output a "load" signal. All of the signals and their interaction will become apparent in the discussion of the logic operation.

A clock generator 20 is located within an asynchronous clock domain 24 of the logic and consists primarily of a clock crystal 28, an oscillator 32, and a phase-locked loop (PLL) 36 where all signals other than the clock generator signal CLK are asynchronous signals. The clock crystal, the oscillator, and the PLL are all conventional devices that are formed and operated in a conventional manner. The oscillator generates a base frequency ($f_{osc}$) that is utilized by the PLL to generate the desired clock frequency for the system. The clock signals generated from the clock generator are distributed through a clock distribution system 40 to other logic elements in the synchronous system. Logic elements that receive the clock distribution are identified with the CLK indicator.

The shift register 44 is a binary shift register that is formed from a series of standard flip-flops with asynchronous set inputs. The length of the shift register is determined by the number of flip-flops in the series and can vary depending on desired performance characteristics. In the system of FIG. 1, the shift register continuously pulls a set bit (i.e., a "1") from an input 48 on the left side of the shift register at each clock cycle. The number of clock cycles required for a particular "1" to travel from the left side to the right side of the shift register is equivalent to the number of flip-flops in the shift register. The shift register has another input 52 that receives the "load" signal from the state machine 14, where an active load signal clears the shift register bits such that all of the shift register bit values are "0." The shift register has an input 56 that receives an asynchronous "set" signal that sets all of the register bit values in the shift register to a "1." The shift register has an output 60 that outputs a "deepsleep_n" signal that is characterized as activated when the rightmost register bit value is a "0" and deactivated or inactive when the rightmost register bit value is a "1." An active deepsleep signal (i.e., a "0" bit) causes the clock generator 20 to be disabled and an inactive or deactivated deepsleep signal (i.e., a "1" bit) causes the clock generator to be enabled.

When the shift register 44 is cleared to all zeros by the load signal generated from the state machine 14, the deepsleep_n signal disables the clock generator 20. The deepsleep_n signal is deactivated and the clock generator is enabled upon the occurrence of either one of two events. The first event occurs when the shift register operates for enough clock cycles that a "1" input on the left side of the shift register synchronously propagates to the rightmost register bit, thereby deactivating the deepsleep_n signal. This may be useful in the case of hardware failures, for example if the clock generator does not shut down properly. The second event occurs when an asynchronous set signal is received by the shift register, causing at least the rightmost register bit, and preferably all of the register bits, to be set to a "1" thereby deactivating the deepsleep_n signal.

The number of bits in the shift register 44 can be adjusted to affect the length of the disable signal. For example, if the shift register is four bits wide, then the active deepsleep_n signal will last for four clock cycles after the initial register clearing. The deepsleep_n signal can be lengthened by adding more flip-flops to the shift register. In the preferred embodiment, the shift register should have a sufficient capacity to allow the clock generator 20 to stop generating clock signals before the clock generator is enabled again by the propagation of set bits through the shift register.

The asynchronous edge detector 66 is a conventional device that may consist of a delay line and an AND gate to detect the edge of an incoming asynchronous signal and then generate an asynchronous pulse that is sent to the shift register 44. In the preferred embodiment, the signal that is input into the asynchronous, edge detector is an asynchronous non-maskable interrupt (NMI) signal, although this can be any asynchronous signal. The signal that is output from the asynchronous edge detector is referred to as the "set" signal. The asynchronous set signal causes all of the flip-flops in the shift register to read as a "1" regardless of their current state, thereby deactivating the deepsleep_n signal and waking up the clock generator. When there is no clock running, there can be no setup/hold time violations in the shift register flip-flops.

The counter 70 is a conventional device that synchronously changes its counter value at each clock cycle. For example, if the counter is originally set at "10," in a decrementing counter the counter value will decrement 1 unit for each clock cycle. The clock counter could alternatively increment its counter value at each clock value, although in the preferred embodiment a decrementing clock counter is implemented. Further, in the preferred embodiment, the counter value is refreshed to a pre-established initial counter value each time a designated signal, specifically the "load" signal, is received by the counter. In the example described below, the pre-established counter value is set at 5, although this is not critical to the invention.

The counter performs three tasks in the preferred embodiment. First, the counter refreshes its counter value to the pre-established initial counter value when the "load" signal is active. Second, when the load signal is inactive, the counter decrements its counter value one unit at each clock cycle. Third, when the counter value reaches 0, the counter generates and transmits a synchronous "wake-up" signal to the broader synchronous system 10. The wake-up signal notifies the synchronous system in a synchronous manner that the clock generator has been enabled, thereby allowing the synchronous system to begin performing its intended operations. Although in the preferred embodiment the wake-up signal is activated when the counter reaches 0, any pre-established counter value can be identified as the trigger value.

Figure 2:
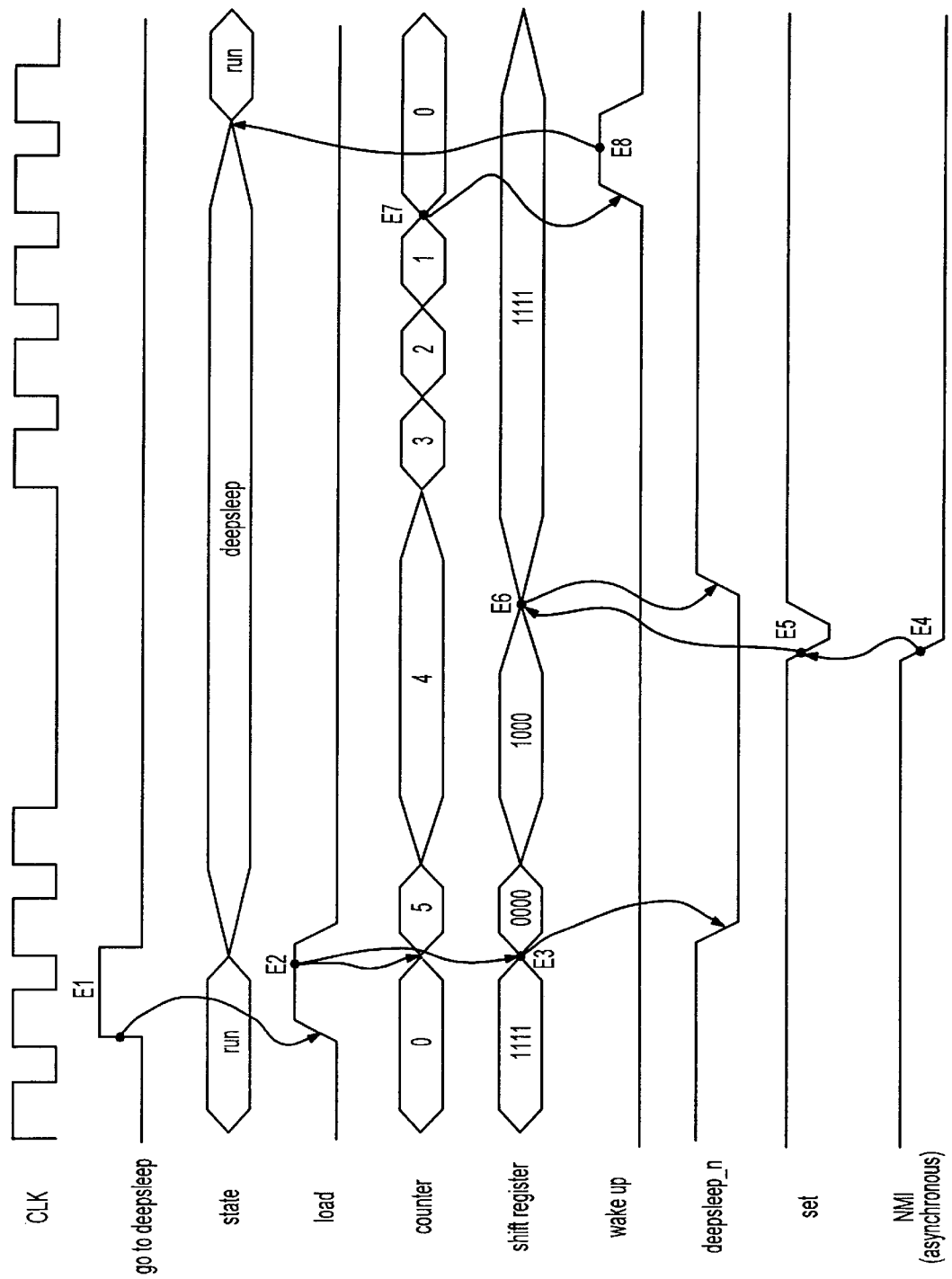
FIG. 2 is a waveform diagram related to the logic of FIG. 1 that reflects the signal transitions involved with disabling and enabling a clock generator in accordance with the invention.

Operation of the logic is described with reference to the waveform diagram of FIG. 2, in addition to FIG. 1. The first operation of the logic is the disabling of the clock generator 20 when disabling the clock generator is desired by the synchronous system. For example, the system may be programmed to turn off the clock after a designated period of non-use. Disabling the clock generator is initiated when the system generates a "go to deepsleep" signal that in turn triggers, at event 1 (E1) in FIG. 2, an active load signal. In response to the go to deepsleep signal, the state machine changes from its "run" state to its "deepsleep" state. At E2, the active load signal is transmitted to the counter 70 and to the shift register 44. In response to the load signal, the counter is refreshed to its pre-established value (in this case 5) and the shift register is cleared such that all of the register bits read as "0." Because all of the register bits have been set to "0" at E3, and because in the preferred embodiment the rightmost register bit controls the deepsleep_n signal generated from the shift register, the deepsleep_n signal changes from a "1" to a "0," causing the deepsleep_n signal to become active. The active deepsleep_n signal is received by the clock generator and operates to shut down the clock generator as indicated by the flat section in the CLK waveform, thereby completing the disable operation. The shut down of the clock generator can take many clock cycles depending on the implementation of the PLL and the oscillator.

During the time that the clock generator 20 is disabled, all synchronous operations in the system 10 and in the clock control logic are frozen. With regard to the clock control logic, the counter 70 does not decrement its counter value unless there is a clock signal and the shift register 44 does not shift values in the register bits unless there is a clock signal. The frozen counter is depicted by the elongated counter signal at value 4 and the frozen shift register is depicted by the shift register bits 1000. In the preferred embodiment, the clock generator can be disabled for an unspecified period of time.

The next operation of the logic is the enabling of the clock generator 20, where the enabling is triggered by some outside asynchronous event. The enabling of the clock generator is initiated by an asynchronous event, E4, that for example purposes is identified as the NMI signal. The NMI signal is received by the asynchronous edge detector 66, causing the asynchronous edge detector to generate an asynchronous pulse on the "set" signal. The set signal generated at E5 is then received by the shift register 44 and in the preferred embodiment, all of the flip-flops that make up the shift register are put to "1." Because the clock is not running there are no setup/hold time violations in the shift register flip-flops. With all of the shift register bits set to "1," at E6 the rightmost bit causes the deepsleep_n signal to be deactivated by transitioning the deepsleep_n signal from "0" to a "1." The deactivation of the deepsleep_n signal causes the clock generator to be enabled and to start generating clock signals, thereby completing the enable function. The clock generator starts generating clock signals some time after the deactivation of the deepsleep_n signal, as indicated by the CLK waveform. However, the exact time is not critical to the invention. The disabling and/or enabling of the clock generator may take time because the clock generator has to synchronize the deepsleep_n signal and then change its internal state.

The last operation of the logic is to indicate to the synchronous system 10, with a synchronous signal, that the clock generator 20 is enabled. The process of indicating to the system is initiated when the clock generator begins generating clock signals again. As stated above, the counter 70 only decrements its counter value in synchronization with clock cycles, and so when the clock generator restarts, the counter restarts counting down toward 0 from wherever the counter value was when the clock generator stopped running. When the counter reaches 0, as indicated at E7, the counter generates a synchronous signal, referred to as the "wake-up" signal, that is sent to the synchronous system, indicating that the clock generator is enabled. The wake-up signal sent to the system is a synchronous signal that is synchronized with the clock generator even though the initial signal that started the clock generator wake-up process was an asynchronous signal. As indicated at E8, the wake-up signal is also sent to the state machine 14, where the wake-up signal causes the state machine to change from the deepsleep state to the run state. By utilizing the shift register to enable the clock generator with an asynchronous signal and by utilizing the counter 70 to initiate a synchronous wake-up signal, the asynchronous and synchronous signal domains are kept separate and the asynchronous shift register outputs are not read by the synchronous logic.

Figure 3:
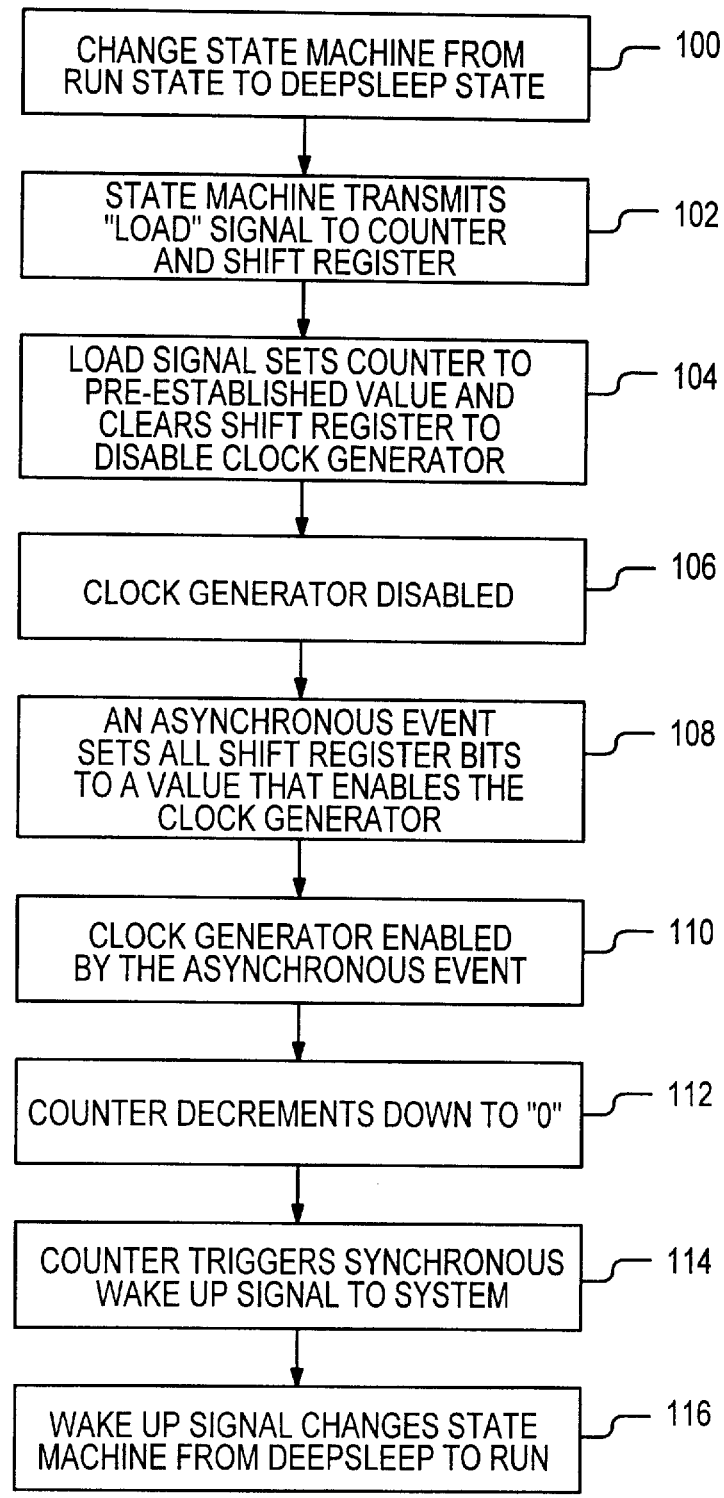
FIG. 3 is a process flow diagram for disabling and enabling a clock generator in accordance with the invention.

The steps involved in disabling/enabling the clock generator and notifying the system are summarized in the process flow diagram of FIG. 3. In a first step 100, the state machine is changed from a run state to a deepsleep state by the go to deepsleep signal transmitted from the synchronous system. In a next step 102, the state machine transmits a load signal to the counter and the shift register. In a next step 104, the load signal sets the counter to a pre-established initial counter value and clears the shift register, causing the shift register to generate a deepsleep_n signal. In a next step 106, in response to the deepsleep_n signal from the shift register, the clock generator is disabled. In step 108, an asynchronous event sets all of the shift register bits to a value that enables the clock generator (i.e. "1"). In a next step 110, the clock generator is enabled in response to the asynchronous event. At step 112, the counter begins to synchronously decrement down to zero. In step 114, when the counter value reaches zero, the counter triggers a synchronous wake-up signal to the system. Then, in step 116, the wake-up signal from the counter causes the state machine to change from the deepsleep state to the run state.

Figure 4:
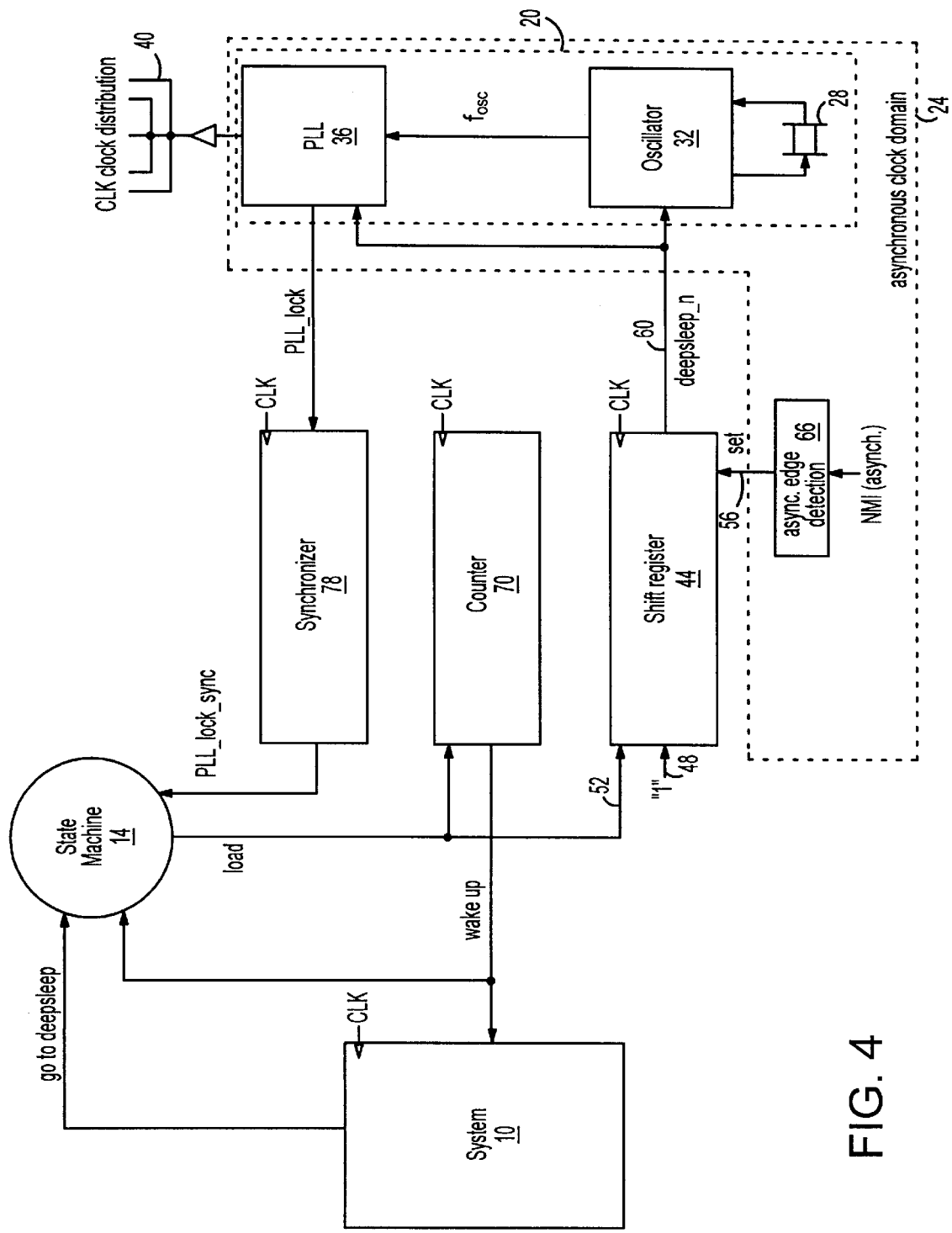
FIG. 4 is a logic diagram for an enhanced system which disables and enables a clock generator in addition to sending a synchronized PLL_lock signal to a state machine in accordance with the invention.

FIG. 4 depicts an enhancement of the preferred embodiment of the invention where a "PLL_lock" signal is output from the PLL to indicate to the state machine 14 when the PLL has reached the target clock frequency. Since the PLL_lock signal is asynchronous and must be synchronized before interacting with the synchronous system, a synchronizer 78 is located between the PLL and the state machine to synchronize the PLL_lock signal. A synchronizer implemented in the system consists of two connected flip-flops. With the addition of the synchronizer, the state machine can be held in the deepsleep state until the clock generator is enabled and the PLL is locked.

In a further enhancement, the state machine 14 can be simplified down to a single register where a "1" bit indicates a run mode and a "0" bit indicates a deepsleep mode. In addition, the level and number of signals used in the logic can vary. For example, the load signal can be split into two independent signals. Further, as is evident to one of ordinary skill in the art, the binary logic can be implemented with opposite bit values, where "0"s are swapped for "1"s, and vice versa.

What is claimed is:

1. An apparatus for enabling and disabling a clock generator that generates clock signals for a synchronous system comprising:
   means for disabling a clock generator with a first synchronous signal and enabling said clock generator with an asynchronous signal; and
   means for generating a second synchronous signal that notifies said synchronous system that said clock generator has been enabled, where said means for generating is initiated by said first synchronous signal.

2. The apparatus of claim 1 wherein said means for disabling and enabling includes a shift register that increments on each clock signal of said clock generator.

3. The apparatus of claim 2 wherein said shift register includes:
   a first input for receiving said first synchronous signal where said first synchronous signal clears said shift register such that a controlling shift register bit has a register bit value that reflects a clock disabling value;
   a second input for receiving said asynchronous signal into said shift register, where said asynchronous signal changes said register bit value of said controlling shift register bit to said clock enabling value; and
   a first output for transmitting an enable signal to said clock generator when said controlling shift register bit changes to said clock enabling value in response to said asynchronous signal.

4. The apparatus of claim 3 wherein said shift register includes a third input for receiving a first set signal, where said first set signal changes a register bit value of a first shift register bit to a clock enabling value.

5. The apparatus of claim 3 further including an asynchronous edge detector operationally connected to said shift register for transmitting said asynchronous signal to said shift register.

6. The apparatus of claim 2 wherein said means for generating said second synchronous signal includes a counter that changes counter values based on clock signals from said clock generator.

7. The apparatus of claim 6 wherein said counter includes an input for receiving said first synchronous signal where said first synchronous signal sets said counter to a first pre-established counter value.

8. The apparatus of claim 7 wherein said counter includes an output for transmitting said second synchronous signal to said synchronous system indicating that said clock generator has been enabled when said counter changes to a second pre-established counter value.

9. The apparatus of claim 6 further including:
   a synchronizer connected to said clock generator for synchronizing a clock generator lock signal; and
   an asynchronous edge detector connected to said shift register for supplying an asynchronous signal to said shift register.

10. A method for controlling a clock generator that generates clock signals for a synchronous system comprising the steps of:

disabling said clock generator in response to a first synchronous signal;

enabling said clock generator in response to an asynchronous signal; and generating a second synchronous signal to indicate to said synchronous system that said clock generator has been enabled, where said generation of said second synchronous signal is initiated in response to said first synchronous signal.

11. The method of claim 10 wherein said step of disabling said clock generator includes a step of clearing a shift register in response to said first synchronous signal.

12. The method of claim 11 wherein said step of clearing triggers a step of generating a clock generator disable signal which is received by said clock generator causing said clock generator to be disabled.

13. The method of claim 11 wherein said step of enabling said clock generator includes a step of activating an identified register bit in said shift register.

14. The method of claim 13 wherein said step of activating an identified register bit includes steps of:

synchronously incrementing said shift register until said identified register bit is activated; or utilizing said asynchronous signal to cause said identified register bit to be activated.

15. The method of claim 13 wherein said step of activating includes a step of utilizing said asynchronous signal to reset a flip-flop of said shift register that represents said identified register bit.

16. The method of claim 13 wherein said step of generating said second synchronous signal includes a step of setting a counter to a pre-established counter value in response to said first synchronous signal.

17. The method of claim 16 wherein said step of generating said second synchronous signal includes steps of:

changing said counter value at each clock signal from said clock generator; and triggering said second synchronous signal when said counter reaches an identified counter value.

18. The method of claim 17 further including a step of generating a signal that indicates when said clock generator has reached its target frequency after being enabled in response to said asynchronous signal.

19. An apparatus for enabling and disabling a clock generator that generates clock signals for a synchronous system comprising:

a shift register having a finite number of binary shift register bits wherein said shift register bits shift in synchronization with said clock signals from said clock generator, and wherein at least one of said shift register bits enables and disables said clock generator, said shift register having a first input for receiving a first synchronous signal from said synchronous system where said first synchronous signal changes said at least one shift register bit to a value that disables said clock generator, and said shift register having a second input for receiving an asynchronous signal where said asynchronous signal changes said at least one shift register bit to a value that enables said clock generator; and a counter that changes its counter value in synchronization with said clock signals from said clock generator wherein said counter value of said counter is set to a first pre-established counter value in response to said first synchronous signal, and wherein said counter generates a second synchronous signal that is in synchronization with said clock generator when said counter value changes to a second pre-established counter value, said second synchronization signal being used to indicate to said synchronous system that said clock generator is enabled.

20. The apparatus of claim 19 wherein said shift register includes a third input that changes a first shift register bit in said shift register to a value that enables said clock generator, wherein said value of said first register bit propagates through said shift register in synchronization with said clock signals from said clock generator to said at least one shift register bit that enables and disables said clock generator.

* * * * *